(12) United States Patent  
Eickhoff et al.

(10) Patent No.: US 9,029,028 B2
(45) Date of Patent: May 12, 2015

(54) HYDROGEN AND ELECTRICAL POWER GENERATOR

(75) Inventors: Steven J. Eickhoff, Plymouth, MN (US); Adam McBrady, Minneapolis, MN (US); Ulrich Bonne, Kailua-Kona, HI (US); Roland A. Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 60 days.

(21) Appl. No.: 13/113,984

(22) Filed: May 23, 2011

(65) Prior Publication Data

US 2011/0286884 A1    Nov. 24, 2011

Related U.S. Application Data

(63) Continuation-in-part of application No. 10/907,294, filed on Mar. 28, 2005, now abandoned, which is a continuation-in-part of application No. 10/750,581, filed on Dec. 29, 2003, now Pat. No. 8,153,285.

(51) Int. Cl.
| | |
|---|---|
| *G01N 27/00* | (2006.01) |
| *H01M 8/00* | (2006.01) |
| *H01M 8/06* | (2006.01) |
| *H01M 8/04* | (2006.01) |
| *H01M 16/00* | (2006.01) |

(52) U.S. Cl.
CPC ...... *H01M 8/04007* (2013.01); *H01M 8/04089* (2013.01); *H01M 8/04156* (2013.01); *H01M 8/04223* (2013.01); *H01M 8/0606* (2013.01); *H01M 8/065* (2013.01); *H01M 16/006* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2,935,382 | A | 5/1960 | Osborn et al. |
| 3,133,837 | A | 5/1964 | Eidensohn et al. |
| 3,146,616 | A | 9/1964 | Loyd |
| 3,557,532 | A | 1/1971 | Broerman |
| 3,594,232 | A | 7/1971 | Spahbier |
| 3,650,840 | A | 3/1972 | Dietz |

(Continued)

FOREIGN PATENT DOCUMENTS

| | | |
|---|---|---|
| DE | 2934566 | 3/1981 |
| DE | 3234146 | 3/1984 |

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner* — Melvin C Mayes
*Assistant Examiner* — Colin W Slifka
(74) *Attorney, Agent, or Firm* — Schwegman Lundberg & Woessner, P.A.

(57) ABSTRACT

A device using needed hydrogen gas flow and electricity for operation obtained from a fuel cell power supply. Also, water generated by the fuel cell may be recycled for hydrogen generation which may be used by the device and in turn expanded by the fuel cell for further electrical power generation. The device may be a gas chromatograph, a fluid calibration mechanism, a flame ionization detector, or the like.

16 Claims, 9 Drawing Sheets

(56) References Cited

U.S. PATENT DOCUMENTS

| | | | |
|---|---|---|---|
| 3,783,356 A | 1/1974 | Lide, III et al. | |
| 3,931,395 A | 1/1976 | Beckert et al. | |
| 4,043,196 A | 8/1977 | Trageser | |
| 4,048,385 A | 9/1977 | Regnaut | |
| 4,155,712 A * | 5/1979 | Taschek | 422/239 |
| 4,228,815 A | 10/1980 | Juffa et al. | |
| 4,476,196 A | 10/1984 | Poeppel et al. | |
| 4,476,197 A | 10/1984 | Herceg | |
| 4,478,076 A | 10/1984 | Bohrer | |
| 4,483,200 A | 11/1984 | Togawa et al. | |
| 4,507,974 A | 4/1985 | Yelderman | |
| 4,576,050 A | 3/1986 | Lambert | |
| 4,596,748 A | 6/1986 | Katz et al. | |
| 4,659,559 A | 4/1987 | Struthers | |
| 4,735,082 A | 4/1988 | Kolloff | |
| 4,759,210 A | 7/1988 | Wohltjen | |
| 4,826,741 A | 5/1989 | Aldhart et al. | |
| 4,857,420 A | 8/1989 | Maricle et al. | |
| 4,876,163 A | 10/1989 | Reichner | |
| 4,906,536 A | 3/1990 | Simonton | |
| 4,909,078 A | 3/1990 | Sittler et al. | |
| 4,910,100 A | 3/1990 | Nakanishi et al. | |
| 4,944,035 A | 7/1990 | Aagardl et al. | |
| 5,031,126 A | 7/1991 | McCulloch et al. | |
| 5,044,766 A | 9/1991 | Stuart | |
| 5,056,047 A | 10/1991 | Sondergeld | |
| 5,146,414 A | 9/1992 | McKown et al. | |
| 5,243,858 A | 9/1993 | Erskine et al. | |
| 5,263,380 A | 11/1993 | Sultan et al. | |
| 5,268,302 A | 12/1993 | Rounbehler et al. | |
| 5,298,341 A | 3/1994 | Khandkar et al. | |
| 5,313,061 A | 5/1994 | Drew et al. | |
| 5,372,617 A | 12/1994 | Kerrebrock et al. | |
| 5,379,630 A | 1/1995 | Lacey | |
| 5,449,697 A | 9/1995 | Noaki et al. | |
| 5,463,899 A | 11/1995 | Zemel et al. | |
| 5,533,412 A | 7/1996 | Jerman et al. | |
| 5,534,363 A | 7/1996 | Sprouse et al. | |
| 5,587,520 A | 12/1996 | Rhodes | |
| 5,804,329 A | 9/1998 | Amendola | |
| 5,836,750 A | 11/1998 | Cabuz | |
| 5,851,689 A | 12/1998 | Chen | |
| 5,861,221 A | 1/1999 | Ledjeff et al. | |
| 5,922,974 A | 7/1999 | Davison et al. | |
| 6,016,027 A | 1/2000 | DeTemple et al. | |
| 6,093,501 A | 7/2000 | Werth | |
| 6,127,058 A | 10/2000 | Pratt et al. | |
| 6,139,384 A | 10/2000 | DeTemple et al. | |
| 6,178,811 B1 | 1/2001 | Bonne et al. | |
| 6,179,986 B1 | 1/2001 | Swette et al. | |
| 6,194,833 B1 | 2/2001 | DeTemple et al. | |
| 6,250,078 B1 | 6/2001 | Amendola et al. | |
| 6,268,076 B1 | 7/2001 | Diekmann et al. | |
| 6,280,869 B1 | 8/2001 | Chen | |
| 6,308,553 B1 | 10/2001 | Bonne et al. | |
| 6,326,097 B1 | 12/2001 | Hockaday | |
| 6,393,894 B1 | 5/2002 | Bonne et al. | |
| 6,471,850 B2 | 10/2002 | Shiepe et al. | |
| 6,494,617 B1 | 12/2002 | Stokes et al. | |
| 6,524,450 B1 | 2/2003 | Hara | |
| 6,535,658 B1 | 3/2003 | Mendoza et al. | |
| 6,541,149 B1 | 4/2003 | Maynard et al. | |
| 6,596,236 B2 | 7/2003 | DiMeo, Jr. et al. | |
| 6,610,193 B2 | 8/2003 | Schmitman | |
| 6,620,542 B2 | 9/2003 | Pan | |
| 6,632,554 B2 | 10/2003 | Doshi et al. | |
| 6,638,654 B2 | 10/2003 | Jankowksi et al. | |
| 6,645,651 B2 | 11/2003 | Hockaday et al. | |
| 6,672,078 B2 | 1/2004 | Ovshinsky et al. | |
| 6,684,135 B2 | 1/2004 | Uenodai et al. | |
| 6,727,012 B2 | 4/2004 | Chen et al. | |
| 6,746,496 B1 | 6/2004 | Kravitz et al. | |
| 6,792,794 B2 | 9/2004 | Bonne et al. | |
| 6,801,136 B1 | 10/2004 | Goodman et al. | |
| 6,803,136 B2 | 10/2004 | Ong et al. | |
| 6,804,949 B2 | 10/2004 | Andrews et al. | |
| 6,833,207 B2 | 12/2004 | Joos et al. | |
| 6,852,436 B2 | 2/2005 | Badding et al. | |
| 6,866,806 B2 | 3/2005 | Andrews et al. | |
| 6,942,941 B2 | 9/2005 | Blunk et al. | |
| 6,953,009 B2 | 10/2005 | Reinke et al. | |
| 7,001,681 B2 | 2/2006 | Wood | |
| 7,049,024 B2 | 5/2006 | Leban | |
| 7,074,509 B2 | 7/2006 | Rosenfeld et al. | |
| 7,128,997 B2 | 10/2006 | Harding et al. | |
| 7,322,205 B2 | 1/2008 | Bourne et al. | |
| 7,364,912 B2 | 4/2008 | Schmidt et al. | |
| 7,367,334 B2 | 5/2008 | Falson, Jr. et al. | |
| 7,524,342 B2 | 4/2009 | Brinkley, III | |
| 7,691,527 B2 | 4/2010 | Petillo et al. | |
| 7,727,647 B2 | 6/2010 | Eickhoff et al. | |
| 7,788,048 B2 | 8/2010 | Thielman et al. | |
| 7,816,045 B2 | 10/2010 | Oishi et al. | |
| 7,879,472 B2 | 2/2011 | Wood et al. | |
| 8,153,285 B2 | 4/2012 | Higashi et al. | |
| 2001/0028973 A1 | 10/2001 | Ong et al. | |
| 2002/0068213 A1 | 6/2002 | Kaiser et al. | |
| 2002/0102450 A1 | 8/2002 | Badding et al. | |
| 2002/0154310 A1 | 10/2002 | DiMeo, Jr. et al. | |
| 2002/0177031 A1 | 11/2002 | Doshi et al. | |
| 2002/0182459 A1 | 12/2002 | Hockaday et al. | |
| 2002/0182462 A1 * | 12/2002 | Ballantine et al. | 429/23 |
| 2002/0198636 A1 | 12/2002 | Uenodai et al. | |
| 2003/0017373 A1 * | 1/2003 | Forte et al. | 429/19 |
| 2003/0044656 A1 | 3/2003 | Wood | |
| 2003/0054215 A1 | 3/2003 | Doshi et al. | |
| 2003/0077492 A1 * | 4/2003 | Kuriiwa et al. | 429/22 |
| 2003/0082431 A1 | 5/2003 | Klitsner et al. | |
| 2003/0091878 A1 | 5/2003 | Rosenfeld | |
| 2003/0157018 A1 | 8/2003 | Zaluski et al. | |
| 2003/0215679 A1 | 11/2003 | Reinke et al. | |
| 2004/0053100 A1 | 3/2004 | Stanley et al. | |
| 2004/0215407 A1 | 10/2004 | Thielman et al. | |
| 2005/0142410 A1 | 6/2005 | Higashi et al. | |
| 2005/0166812 A1 | 8/2005 | Noll et al. | |
| 2005/0181245 A1 | 8/2005 | Bonne et al. | |
| 2005/0199546 A1 | 9/2005 | Rusta-Sallehy et al. | |
| 2006/0045228 A1 | 3/2006 | Shiao et al. | |
| 2006/0210850 A1 | 9/2006 | Abouatallah et al. | |
| 2006/0261349 A1 | 11/2006 | Doering et al. | |
| 2007/0105008 A1 | 5/2007 | Gu et al. | |
| 2007/0217994 A1 | 9/2007 | Amendola et al. | |
| 2007/0259227 A1 | 11/2007 | Oishi et al. | |
| 2007/0269698 A1 | 11/2007 | Gu | |
| 2007/0275291 A1 | 11/2007 | Gu et al. | |
| 2007/0277870 A1 | 12/2007 | Wechsler | |
| 2007/0287059 A1 | 12/2007 | Eickhoff et al. | |
| 2009/0252670 A1 | 10/2009 | Eickhoff et al. | |

FOREIGN PATENT DOCUMENTS

| | | |
|---|---|---|
| DE | 4222458 | 1/1994 |
| DE | 4243573 | 6/1994 |
| DE | 29607315 | 8/1996 |
| DE | 19619133 | 11/1997 |
| DE | 19734259 | 2/1999 |
| EP | 0232719 | 8/1987 |
| EP | 0348245 | 12/1989 |
| EP | 0364982 | 4/1990 |
| EP | 0419873 | 4/1991 |
| EP | 0468793 | 1/1992 |
| EP | 0702212 | 3/1996 |
| EP | 0773432 | 6/1997 |
| EP | 1351329 | 10/2003 |
| EP | 1496561 | 1/2005 |
| EP | 1372205 | 10/2008 |
| GB | 723180 | 2/1955 |
| GB | 723180 A1 | 2/1955 |
| GB | 2164446 | 3/1986 |
| GB | 2164446 A | 3/1986 |
| GB | 2287792 | 9/1995 |
| JP | 56153256 | 11/1981 |
| JP | 57131029 | 8/1982 |
| JP | 57138782 | 8/1982 |

(56) References Cited

FOREIGN PATENT DOCUMENTS

| | | |
|---|---|---|
| JP | 57206830 | 12/1982 |
| JP | 60000066 | 1/1985 |
| JP | 4342439 | 11/1992 |
| JP | 6-66787 A | 3/1994 |
| JP | 6066787 | 3/1994 |
| JP | 9326259 | 12/1997 |
| JP | 09326259 A | 12/1997 |
| JP | 2004206998 | 7/2004 |
| WO | WO 92/06369 | 4/1992 |
| WO | WO 94/20825 | 9/1994 |
| WO | WO 98/22793 | 5/1998 |
| WO | WO 00/35032 | 6/2000 |
| WO | WO 00/45457 | 8/2000 |
| WO | WO 01/85606 | 11/2001 |
| WO | WO 03/084866 | 10/2003 |
| WO | WO 2004/025750 | 3/2004 |
| WO | WO 2004/035464 | 4/2004 |
| WO | WO 2004/075375 | 9/2004 |
| WO | WO 2005/013403 | 2/2005 |

OTHER PUBLICATIONS

Amendola et al., "A Novel High Power Density Borohydride-Air Cell," Electromechanical Society Proceedings, vol. 98-15, pp. 47-54, Nov. 1, 1998.

Amendola et al., "A Safe Portable Hydrogen Gas Generator Using Aqueous Borohyfride Solution and Ru Catalyst," International Journal of Hydrogen Energy, Vo., 25, No. 10, pp. 969-975, Oct. 2000.

Amendola et al., An Ultrasafe Hydrogen Generator: Aqueous, Alkaline Borohydride Solutions and Ru Calalyst, Journal of Power Sources, vol. 85, No. 2, pp. 186-189, Feb. 2000.

Atalla et al., "Measurement of Thermal Properties of Liquids with an AC Heated-Wire Technique," Interational Journal of Thermophysics, vol. 2, No. 2, 1981.

Atalla et al., "Radiation Effects with the AC Heated Strip Technique for the Measurement of Thermal Properties of Liquids," High Temperatures—High Pressures, vol. 17, pp. 447-452, 1985.

Bonne et al., "Industrial Wireless PHASED Sensor Phase 1. Feasibility Demonstration," Progress Report for 4th Quarter of 2002, pp. 1-17, Jan. 31, 2002.

Bonne, et al., "Actuation-based Microsensors," Smart Materials and Structures, 10, pp. 1185-1195, 2001.

Bonne, et al., "PHASED, a Faster, Smarter and More Affordable Gas Analysis Device—Update," International Forum on Process Analytical Chemistry (IFPAC) Scottsdale, AZ, Jan. 21-24, 2003.

Bonne, et al., "PHASED: a Faster, Smarter and More Affordable Gas Analysis Device," 16th International Forum on Process Analytical Chemistry, San Diego, CA., 17 pages, Jan. 22-25, 2002.

Bonne, U., et al., "New Gas Composition and Trace Contaminant Sensors," GTI Natural Gas Technologies Conference, Orland, FL, Sep. 30-Oct. 2, 2002, pp. 1-12.

Cabuz, et al., "Mesoscopic Sampler Based on 3-DF Arrays of Electrostatically Actuated Diaphragms," Proc. 10th Conf. S.S. S&A. Transducers '99 Jun. 7-12, 1999, Sendai, Japan.

Cabuz, et al., "The Dual Diaphragm Pump," IEEE, pp. 519-522, 2001.

Dipl.-Ing. Dr. techn. Wolfgang Wehrmann et al., "Korrelationstechnik," Expert Verlag, Grafenau, XP002094984, 173 pages, 1980.

Fuggerth, "Zone Gas Chromatography," Analytical Chemistry, 61, No. 14, pp. 1478-1485, 1989.

Honeywell Electronic Materials Interconnect Solutions, Thin Films—Dielectrics, Comparison of Solution and Film Properties, Advanced Products for IC Fabrication, 1 page, prior to May 23, 2011.

Horizon Fuel Cell Technologies, "Hobby RC Industry Leaps into the Future with Hydrogen Power," 2 pages, Feb. 3, 2010.

Http://www.advanced-polymers.com/star_center/technical_papers/reduction_in_effective_dielectric_constant.pdf, "Nanoglass," 1 page, 1 page, prior to May 23, 2011.

http://www.chrompack.com/cgi/applicsview?ap=A00607&Go=G0, NexTrieve document view, 2 pages, printed Dec. 26, 2002.

http://www.engadget.com/2010/02/03/horizon-debuts-h-cell . . . , "Horizon Debuts H-Cell 2.0 Hydrogen Fuel Cell System for R/C Cars," 3 pages, printed Feb. 12, 2010.

http://www.zoex.com/html/technote_kt030505-1.html, Zoex Corporation, "A New Window on the Che," 5 pages, printed Mar. 15, 2004.

International Search Report, PCT/US00/19924, mailed Mar. 5, 2001, 7 pages.

Kenndler, Ernst, "Gas Chromatography," Institute for Analytical Chemistry, University of Vienna, pp. 1-34, Sep. 9, 1999.

Kindlund et al., "Quartz Crystal Gas Monitor With Gas Concentrating Stage," Sensors and Actuators, vol. 6, No. 1, pp. 1-17, Sep. 1984.

Park, et al., "Microdischarge Arrays: A New Family of Photonic Devices (Revised)," IEEE Journal on Selected Topics in Quantum Electronics, vol. 8, No. 2, pp. 387-394, Mar./Apr. 2002.

Park, et al., "Photodetection in the Visible, Ultraviolet, and Near-Infrared with Silicon Microdischarge Devices," Applied Physics Letters, vol. 81, No. 24, pp. 4529-4531, Dec. 9, 2002.

Park, et al., "Arrays of Silicon Micro Discharge Devices with Multicomponent Dielectrics," Optics Letters, vol. 26, No. 22, pp. 1773-1775, Nov. 15, 2001.

Phillips, J.B. et al., "Thermal Modulation: A Chemical Instrumentation Component of Potential Value in Improving Portability," Field Analytical Chemistry and Technology, 1(1): 23-29, 1996.

Quimby, et al., "Evaluation of a Microwave Cavity, Discharge Tube, and Gas Flow System of Combined Aas Chromatography—Atomic Emission Detection," Analytical Chemistry, vol. 62, No. 10, pp. 1027-1034, May 15, 1990.

Stevenson, "Wintergreen '97," The World of Separation Science, The 19th International Symposium on Capillary Chromatography and Electrophoresis, 11 pages, printed Jul. 22, 2003.

Toker et al., "Design and Development of a Fiber Optic TDI CCD-Based Slot-Scan Digital Mammography System," X-ray Detector Physics and Applications II, Proceedings SPIE—The International Society for Optical Engineering, vol. 2009, pp. 246-252, Jul. 13-14, 1993.

Whitman et al., "Double-Injection FIA Using First-Order Calibration for Multicomponent Analysis," Analytical Chemistry 63, pp. 775-781, 1991.

"U.S. Appl. No. 10/750,581, Advisory Action mailed Jan. 6, 2009", 3 pgs.

"U.S. Appl. No. 10/750,581, Advisory Action mailed Feb. 23, 2011", 2 pgs.

"U.S. Appl. No. 10/750,581, Advisory Action mailed Mar. 23, 2010", 3 pgs.

"U.S. Appl. No. 10/750,581, Advisory Action mailed Dec. 21, 2007", 3 pgs.

"U.S. Appl. No. 10/750,581, Final Office Action mailed Sep. 24, 2007", 10 pgs.

"U.S. Appl. No. 10/750,581, Final Office Action mailed Oct. 28, 2008", 15 pgs.

"U.S. Appl. No. 10/750,581, Final Office Action mailed Dec. 3, 2010", 12 pgs.

"U.S. Appl. No. 10/750,581, Final Office Action mailed Dec. 14, 2009", 11 pgs.

"U.S. Appl. No. 10/750,581, Non Final Office Action mailed Apr. 6, 2007", 9 pgs.

"U.S. Appl. No. 10/750,581, Non Final Office Action mailed Apr. 15, 2009", 11 pgs.

"U.S. Appl. No. 10/750,581, Non Final Office Action mailed Apr. 16, 2008", 14 pgs.

"U.S. Appl. No. 10/750,581, Non Final Office Action mailed Jun. 11, 2010", 11 pgs.

"U.S. Appl. No. 10/750,581, Non Final Office Action mailed Jun. 21, 2011", 6 pgs.

"U.S. Appl. No. 10/750,581, Notice of Allowance mailed Nov. 30, 2011", 6 pgs.

"U.S. Appl. No. 10/750,581, Preliminary Amendment filed May 10, 2004", 13 pgs.

"U.S. Appl. No. 10/750,581, Response filed Feb. 8, 2011 to Final Office Action mailed Dec. 3, 2010", 13 pgs.

(56) References Cited

OTHER PUBLICATIONS

"U.S. Appl. No. 10/750,581, Response filed Mar. 11, 2010 to Final Office Action mailed Dec. 4, 2009", 14 pgs.

"U.S. Appl. No. 10/750,581, Response filed Jul. 5, 2007 to Non Final Office Action mailed Apr. 6, 2007", 15 pgs.

"U.S. Appl. No. 10/750,581, Response filed Jul. 15, 2008 to Non Final Office Action mailed Apr. 16, 2008", 19 pgs.

"U.S. Appl. No. 10/750,581, Response filed Jul. 15, 2009 to Non Final Office Action mailed Apr. 15, 2009", 14 pgs.

"U.S. Appl. No. 10/750,581, Response filed Sep. 10, 2010 to Non Final Office Action mailed Jun. 11, 2010", 14 pgs.

"U.S. Appl. No. 10/750,581, Response filed Sep. 21, 2011 to Non Final Office Action mailed Jun. 21, 2011", 5 pgs.

"U.S. Appl. No. 10/750,581, Response filed Nov. 21, 2007 to Final Office Action mailed Sep. 24, 2007", 16 pgs.

"U.S. Appl. No. 10/750,581, Response filed Dec. 22, 2008 to Final Office Action mailed Oct. 28, 2008", 25 pgs.

"U.S. Appl. No. 10/850,673, 312 Amendment filed Aug. 17, 2010", 5 pgs.

"U.S. Appl. No. 10/850,673, Applicant's Summary of Examiner Interview filed Feb. 26, 2010", 2 pgs.

"U.S. Appl. No. 10/850,673, Examiner Interview Summary mailed Aug. 16, 2010", 4 pgs.

"U.S. Appl. No. 10/850,673, Final Office Action mailed Feb. 9, 2009", 10 pgs.

"U.S. Appl. No. 10/850,673, Final Office Action mailed Oct. 26, 2009", 11 pgs.

"U.S. Appl. No. 10/850,673, Non Final Office Action mailed May 6, 2009", 8 pgs.

"U.S. Appl. No. 10/850,673, Non Final Office Action mailed Jun. 9, 2008", 12 pgs.

"U.S. Appl. No. 10/850,673, Notice of Allowance mailed Mar. 9, 2010", 10 pgs.

"U.S. Appl. No. 10/850,673, Notice of Allowance mailed Jul. 29, 2010", 9 pgs.

"U.S. Appl. No. 10/850,673, PTO Response to 312 Amendment mailed Aug. 26, 2010", 5 pgs.

"U.S. Appl. No. 10/850,673, Response filed Jan. 26, 2010 to Final Office Action mailed Oct. 26, 2009", 10 pgs.

"U.S. Appl. No. 10/850,673, Response filed Apr. 9, 2009 to Final Office Action mailed Feb. 9, 2009", 11 pgs.

"U.S. Appl. No. 10/850,673, Response filed Aug. 6, 2009 to Non Final Office Action May 6, 2009", 10 pgs.

"U.S. Appl. No. 10/850,673, Response filed Sep. 9, 2008 to Non Final Office Action Jun. 9, 2008", 16 pgs.

"U.S. Appl. No. 10/850,673, Response filed Sep. 20, 2007 to Restriction Requirement mailed Aug. 21, 2007", 11 pgs.

"U.S. Appl. No. 10/850,673, Restriction Requirement mailed Aug. 21, 2007", 9 pgs.

"U.S. Appl. No. 10/850,673, Supplemental Amendment filed Dec. 4, 2008", 11 pgs.

"U.S. Appl. No. 10/850,673, Supplemental Response filed Nov. 29, 2007 to Restriction Requirement mailed Aug. 21, 2007", 9 pgs.

"European Application Serial No. 06720936.1, Office Action mailed Jan. 19, 2011", 4 pgs.

"European Application Serial No. 06720936.1, Office Action mailed May 30, 2011", 8 pgs.

"European Application Serial No. 06720936.1, Office Action mailed Jun. 11, 2008", 3 pgs.

"European Application Serial No. 06720936.1, Office Action mailed Aug. 17, 2009", 7 pgs.

"European Application Serial No. 06720936.1, Response filed Feb. 11, 2010 to Office Action mailed Aug. 17, 2009", 13 pgs.

"European Application Serial No. 06720936.1, Response filed May 17, 2011 to Office Action mailed Jan. 19, 2011", 8 pgs.

"European Application Serial No. 06720936.1, Response filed Jul. 29, 2011 to Office Action mailed May 30, 2011", 7 pgs.

"European Application Serial No. 06720936.1, Response filed Oct. 3, 2008 to Office Action mailed Jun. 11, 2008", 6 pgs.

"European Application Serial No. 04814930.6, Office Action mailed Jul. 16, 2008", 5 pgs.

"European Application Serial No. 04814930.6, Office Action mailed Aug. 8, 2006", 2 pgs.

"European Application Serial No. 04814930.6, Office Action mailed Aug. 21, 2006", 2 pgs.

"European Application Serial No. 04814930.6, Response filed Nov. 19, 2008 to Office Action mailed Jul. 16, 2008", 3 pgs.

Aiello, R, et al., "Production of Hydrogen from Chemical hydrides via hydrolysis with steam", International Journal of Hydrogen Energy, 24, (1999), 1123-1130.

Amendola, S. C., et al., "A Safe Portable Hydrogen Gas Generator Using Aqueous Borohyfride Solution and Ru Catalyst.", International Journal of Hydrogen Energy, 25(10), (2000), 969-975.

"European Application Serial No. 04814930.6, Examination Notification Art. 94(3) mailed Jul. 24, 2014", 3 pgs.

\* cited by examiner

HYDROGEN AND ELECTRICAL POWER GENERATOR

This application is a continuation-in-part of and claims the benefit of U.S. patent application Ser. No. 10/907,294, filed Mar. 28, 2005, entitled "Hydrogen and Electrical Power Generator", now abandoned, which is a continuation-in-part of and claims the benefit of U.S. patent application Ser. No. 10/750,581, filed Dec. 29, 2003, entitled "Micro Fuel Cell", now U.S. Pat. No. 8,153,285, both of which are incorporated herein by reference.

BACKGROUND

The disclosure pertains to hydrogen gas generation for usage by a device, and particularly to both hydrogen and electrical power generation for the device.

SUMMARY

The present disclosure relates to hydrogen and electrical power generation for devices that use both hydrogen and electrical power for operation. Further, a by-product of power generation may be recycled for further hydrogen and power generation.

DESCRIPTION

Figure 1:
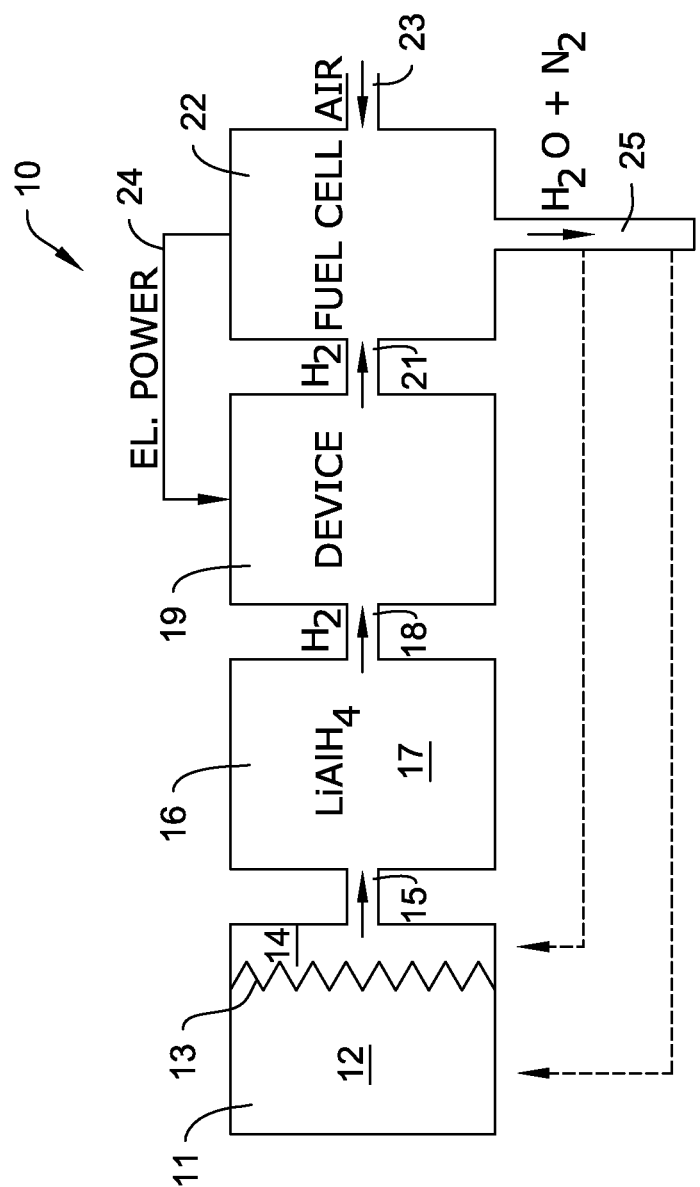
FIG. 1 is a diagram of a hydrogen gas and electrical power generator integrated with a device, such as a fluid chromatograph, that uses both the gas and power.

There may be battery powered devices that need $H_2$ gas flow and power for their operation, such as a field-portable FID (i.e., a $H_2$-flame ionization detector), whether as a stand-alone portable FID or as part of a GC (gas chromatograph) analyzer to scan for natural gas leaks, or a micro GC. These devices may have an $H_2$ or $H_2$—$N_2$ gas tank strapped to one side, which is generally bulky and heavy, which needs to be replaced or re-filled periodically, and which may accrue demurrage charges. Additionally, the portable devices may use heavy batteries, which can render the 8-hour leak-detection work shift with such instruments tiresome.

The present disclosure may indicate a better source for $H_2$ in a form of a special $H_2$ fuel cell. This cell may be more compact (i.e., having higher energy density), have an absence of the heavy pressurized steel tanks, generate electrical power besides $H_2$, store such power for an ease of cold starts, or peak power needs, and thus obviate a need for heavy 8-hour batteries. The generator may recycle the water it generates.

The present generator may provide $H_2$ for a fuel cell. The generator may convert 1.4 $cm^3$ of $LiAlH_4$ and 1.6 $cm^3$ of $H_2O$ to 2000 $cm^3$ of $H_2$. This converting may be expressed chemically as

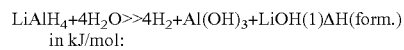

in kJ/mol:

117.2−4×285.83>>0−1273−487−19.2=−518.7 kJ.

This $H_2$ may then generate about 128 Wh of electrical energy in a fuel cell. The fuel cell may have an energy density that is 1.5 to 2 times higher than presently available commercial lithium batteries. An example lithium battery may be similar in size to a "C-cell" battery. Such C-cell battery may be a Tekcell™ CR123A 3 volt battery having a 1.7 cm diameter, 3.5 cm length, at about 8 $cm^3$ and 17 grams. The power output may be about 4.2 Wh or 0.48 mW for a year. A larger battery capable of a power draw of about ten watts would have a size of about 300 $cm^3$. There may be a fuel cell battery designed for an average power draw of 2 milliamps (mA) which is an equivalent to a power of 0.6 V×2 mA=1.2 mW (milliwatts).

For an illustrative example, the hydrogen and power needs of a micro gas analyzer may be about 3 $cm^3$ per minute, which may lead to 2000 $cm^3$ to last for about 650 minutes, which may exceed a goal of operating the micro gas analyzer with no more than an average of 0.25 W. The power equivalent to about 3 $cm^3$/minute may be stated as the following equivalency. One Faraday (96,500 Cb) corresponds to 1 mole, so that one may equate (96500 Cb×3 V) to 22,415 $cm^3$, that is, 3 $cm^3$/minute is equivalent to (3/22415)(96500*3/60)=0.646 W.

The micro fuel cell may allow the chemical fuel to react with the natural water diffusing from the water, since it does not need a liquid pump in the generator. This device may produce about 0.1 cm/minute of $H_2$. To generate 3 cm/minute of $H_2$, they would need to transfer the water 30 times faster. This might be possible using a natural diffusion of water vapor, if a Gore-Tex™ membrane in the cell is increased to an area of about 2"×2". Or one may incorporate a water pump. The water pumping rate may need to be about $4×10^{-5}$ cm/second. The noted items might be regarded as an instance of the disclosure.

Another challenge to overcome for conserving energy is to let the generated $H_2$ adopt the function of the $H_2$ carrier gas pump and replace the pump. If air samples need to be analyzed and its target analytes need to be preconcentrated, at least the separation can then be made in a $H_2$ carrier gas, after the sample is injected into the $H_2$ gas stream. An advantageous aspect may be that the generator can generate $H_2$ under pressure. Another aspect may be that the fuel cell can draw $H_2$ against a vacuum, by virtue of its affinity to react with $O_2$ from the air to form water, which upon condensation may reduce the absolute pressure in the fuel cell a little due to the volume reduction resulting from the following reaction.

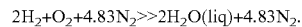

Figure 3:
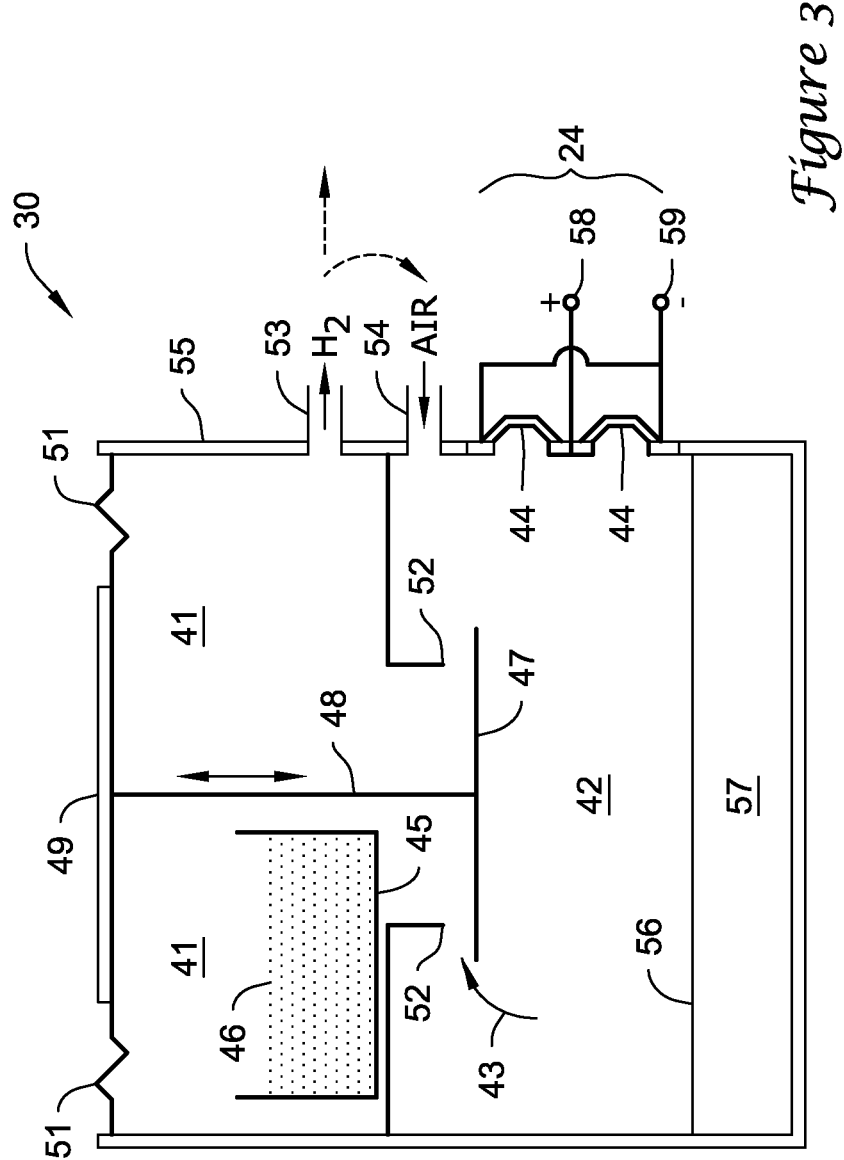
FIG. 3 reveals another configuration of a hydrogen and electrical power generator.

This reaction may amount to a volumetric reduction to about 4.83/7.83=0.617 of the original volume or pressure. This assumes that the $H_2$ fuel cell can facilitate the above reaction against such a pressure difference. The present $H_2$ generation rates may be only limited by the rate of permeation of water (liquid or gas) through the shown Gore-Tex™ membranes which can result in a continuous but uncontrolled $H_2$ and power generation, especially if there are leaks in the pneumatic valve that controls the water supply rate to the $H_2$ generator, as shown in FIG. 3.

Figure 2:
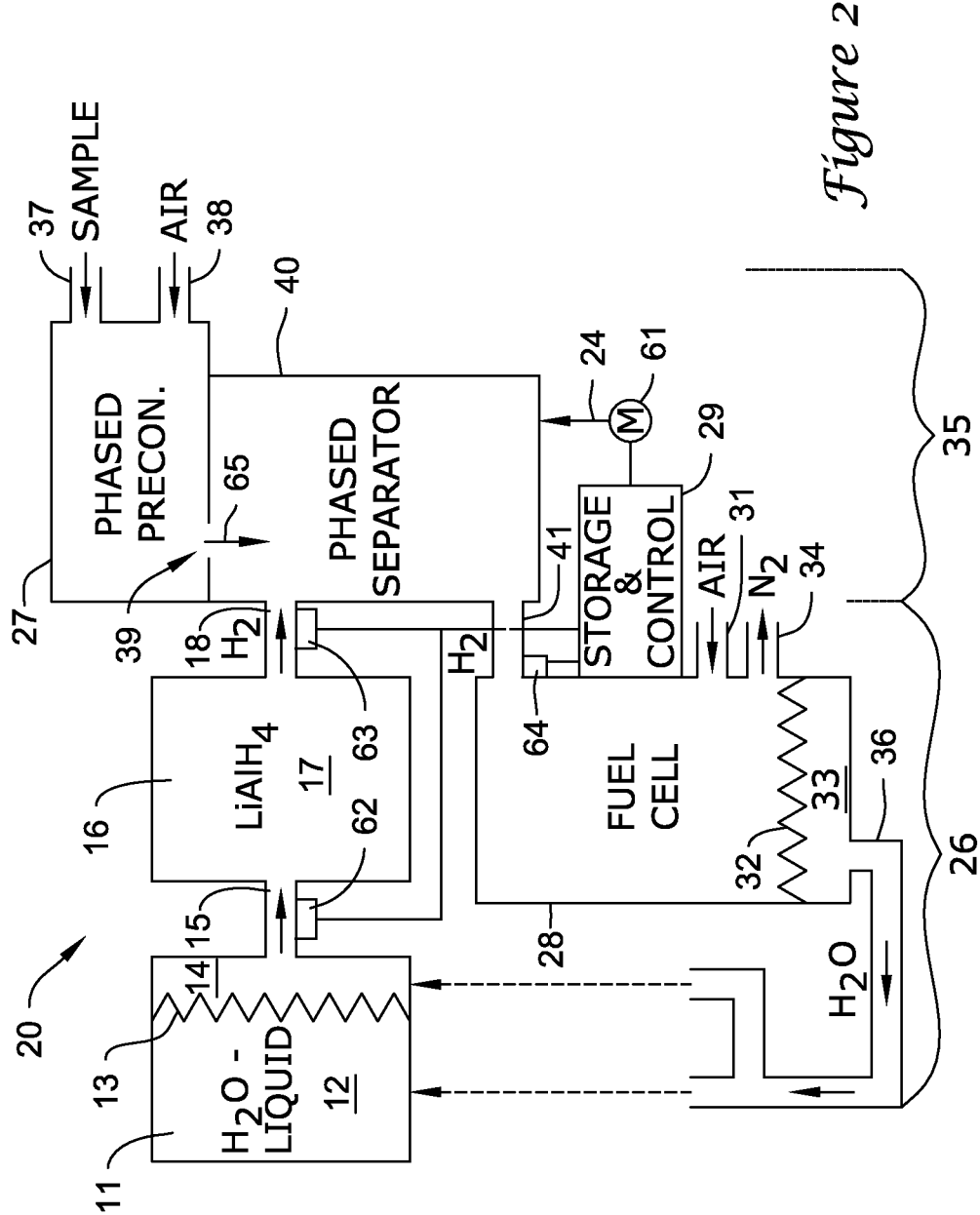
FIG. 2 is similar to FIG. 1 except that the device is a chromatograph with a preconcentrator and has electrical power storage.
Figure 4:
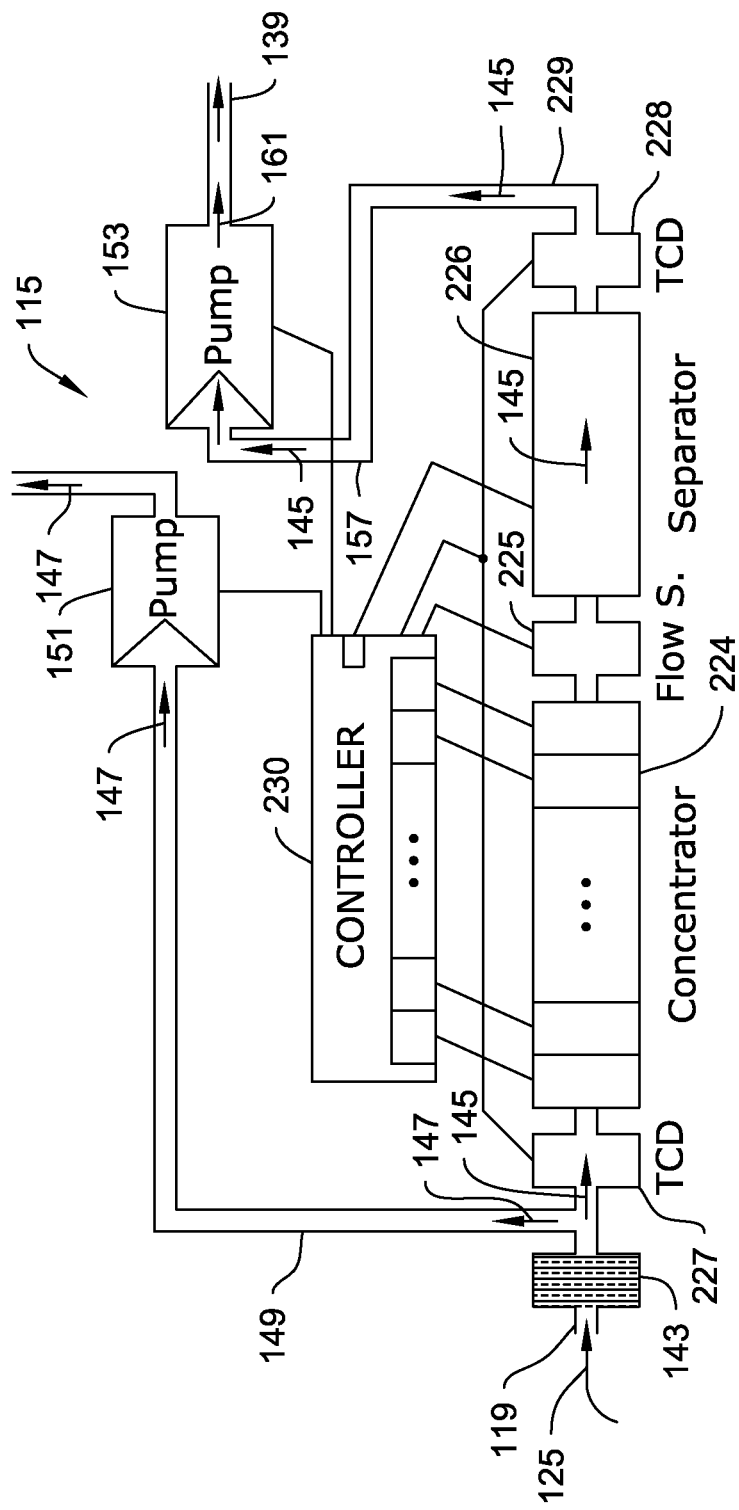
FIG. 4 shows a fluid analyzer that may be used in conjunction with the present generator.

The generator system may have the building blocks of FIGS. 1 and 2, to operate a device such as a GC or FID, or any other device having a need of both $H_2$ and electrical power. FIG. 4 shows an illustrative example of a micro GC that may utilize $H_2$ and electrical power. The brackets 26 and 35 in FIG. 2 show the $H_2$ and power generator, and the device to be electrically powered and supplied with $H_2$, respectively. The non-disposable or non-rechargeable parts may be incorporated in the device package, such as the electric energy storage device, which might not be part of the generator package. A similar box may be drawn for the power-generation controls, so that no power would be generated when the storage is full and the device does not need it.

The sensor system may have a disposable (or rechargeable) "battery" or generator, which generates and provides $H_2$ to separate "devices", before this $H_2$ is returned and used in the generator to also generate electric power via known $H_2$ fuel cell technology. A hydrogen gas generator may supply the $H_2$ and electrical power needs of a device such as an FID and/or micro gas analyzer or a gas calibration system. The gas generator may employ hydrogen-containing chemicals. The hydrogen-containing chemicals may be water and a metal hydride. In a combination of the generator and device, the device may make a non-destructive use of the generated $H_2$ before returning it to the generator. In the generator, the returned hydrogen may be passed to a fuel cell to generate electrical power. The generated electrical power may be stored in a storage device, which may be one or more of the following, incorporating a capacitor, a super capacitor and a rechargeable battery. The water generated in the fuel cell may be recycled to the hydrogen generator to make more hydrogen, and thus reduce the water storage weight and volume. The control of hydrogen flow and pressure may be regulated based on the power drawn by the device. The excess power generated with the needed use of hydrogen may be stored. Such power may be used for data processing, wireless transmission, and/or heating/annealing/regeneration of appropriate device parts, while the hydrogen flow is not needed.

The advantages of the generator-device system may incorporate a disposable or rechargeable "battery" that generates both $H_2$ and electrical power. The system may provide for reduced space, weight and total power consumption, which are premium advantages for portable devices. An energy storage of the system may enable sensor start-up during generator delays, reduced generator power waste when $H_2$ needs exceed the associated power generation, and data processing and transmission without $H_2$ flow. Also, in the system, recycling the water from the fuel cell back to the $H_2$ generation block may reduce weight and volume for $H_2O$ storage.

FIG. 1 is a diagram of a generator 10 for a device that has a need for $H_2$ and electrical power. An example device 19 may be a (PHASED) micro GC system. The first block 11 may contain a volume 12 for containing an $H_2O$ fluid. Across the block 11 containing volume 12 may be a Gore-Tex™ membrane 13 or equivalent material, and a volume 14 on the other side of membrane 13 opposite of volume 12. In volume 14 may be $H_2O$ vapor which may flow through a passage 15 into a block 16 having a volume 17 containing $LiAlH_4$. A chemical reaction between the $H_2O$ vapor and $LiAlH_4$ may result in an $H_2$ gas (and by-products $Al(OH)3$ and $LiOH(1)$. From block 16, the $H_2$ gas may flow through a passage 18 onto a device 19 which may utilize the $H_2$ gas and electrical power. From device 19, $H_2$ gas may flow to a fuel cell 22 via a passage 21. Air maybe brought into the fuel cell 22 through a passage 23. The fuel cell, as a result from these ingredients, may produce electrical power 24 to be sent to device 19 to operate it. A by-product of the fuel cell 22 reaction may be $H_2O$ and $H_2$. The $H_2O$ may condense to a liquid and be fed via a tube 25 into volume 12 of block 11, which in turn may result in a process of going through the membrane to form $H_2O$ vapor, as noted above. $H_2O$ from the fuel cell 22 may be fed directly to volume 14 of block 13.

FIG. 2 shows another diagram of a system 20 having an $H_2$ gas and electric power generator 25 with $H_2O$ reuse, to drive a PHASED micro GC 40 with a preconcentrator 27. Blocks 11 and 16 may operate in a similar fashion as those blocks of system 10 of FIG. 1. Fuel call 28 is similar to fuel cell 22, however, it has an output into a storage and control box 29 which may provide for energy storage from fuel cell 28 and power controls, so that no power would be generated when the storage is full and a device 35 connected to it does not need power at that time. Power 24 may go from the storage and control box 29 to the PHASED micro gas analyzer 40. Air may enter fuel cell 28 via passage 31. There may be a Gore-Tex™ membrane 32 to separate the by-products $H_2O$ and $N_2$ from the fuel cell reaction so that the $H_2O$ may enter volume 33 and $N_2$ may exit fuel cell 28 via passage 34. $H_2O$ may exit fuel cell 28 via passage 36 and go to block 11 with the liquid $H_2O$ to volume 12 and the $H_2O$ vapor to volume 14.

Device 35 may consist of a preconcentrator 27 and the phased heater micro gas analyzer 40. A sample and air may enter preconcentrator 27 via passages 37 and 38, respectively. The preconditioned sample 65 may be injected or go from preconditioner 27 to gas analyzer 40 via an orifice 39. Analyzer 40 may obtain $H_2$ gas from the chemical reaction in block 16 producing $H_2$, via the passage 18. Analyzer 40 may utilize the $H_2$ as a carrier gas in its process and then pass on $H_2$ gas to fuel cell 28 via passage 41 where cell 28 may utilize it in the reaction to generate more electrical energy as needed.

In FIG. 2, there may also be a meter 61 at the output of fuel cell 28 and/or storage control box 29 for measuring power, and connected to the storage and control box 29. There may be pressure sensors, flow sensors and/or valves 62, 63 and 64 situated at passages 15, 18 and 41, respectively, and connected to the storage and control box 29. With inputs to and outputs from between the sensors and valves and the storage and control box, such things as the control of hydrogen flow and pressure may be regulated based on the power drawn from the fuel cell 22 by the analyzer 40, data processing, wireless transmission and/or heating, annealing/regeneration or appropriate devices and/or mechanisms and their parts, and so on.

FIG. 3 shows a schematic view of an $H_2$ generator combination 30 based on $LiAlH_4$ from fuel chamber 41, a hydrogen and water chamber 42 and associated fuel cells 44. Fuel chamber 41 may have a container 45 of a fuel 46 and residue. The fuel 46 may incorporate $LiAlH_4$ which may be combined with water vapor 43 to form $H_2$ in chamber 41 as permitted by valve plate 47 which may be actuated into an open position by a connecting node 48 moved by a diaphragm 49. Diaphragm 49 may be attached to a flexible but air-tight membrane 51 which permits the movement of diaphragm 49 which opens or closes the valve plate 47 relative to a valve seat 52 as needed for providing $H_2$ to the fuel cells 44 to output electrical power. $H_2$ may be provided also from chamber 41 via a passage 53. Air may be provided to chamber 42 for the fuel cells 44 via a passage 54. Power 24 may come from fuel cells 44. The valve plate 47 and seat 52 may form a normally closed or open valve depending ultimately on the need of power 24 from fuel cells 44. Diaphragm 49 may actuate valve plate 47 with a differential pressure external and internal to membrane 51 of container 55 which may be dependent on closure of passages 53 and/or 54. Chamber 42 may have a Gore-Tex™ membrane 56 attached across the bottom portion of container 55 to form a volume 57 which may contain water. The membrane 56 may permit a movement of vapor from volume 57 into volumes 42 and 41. Fuel cells may output a voltage across terminals 58 and 59 to provide the electrical power 24.

FIG. 4 reveals certain aspects of a micro gas apparatus 115. The apparatus 115 may be a fluid composition sensor, analyzer or chromatograph, and have a concentrator 224, separator 226, various detectors 227, 225, 228 and a pump 151, 153. The concentrator may have an array of "phased" heaters that are turned on at different times relative to each other in a fluid stream channel. The apparatus 115 may relate to a phased heater array structure, and to application of the structure as a sensor, analyzer or chromatograph for the identification and quantification of fluid components. Such apparatus 115 having such a (phased) heater configuration may be regarded as or referred to as a "PHASED" device. The term "PHASED" also may be regarded as an acronym referring to "Phased Heater Array Structure for Enhanced Detection".

Sample stream 125 may enter an input from pipe or tube 119, to apparatus 115, as shown in FIG. 4. There may be a particle filter 143 for removing dirt and other particles from the stream of fluid 125 that is to enter apparatus 115. A portion 145 of fluid 125 may flow through the first leg of a differential thermal-conductivity detector (TCD), or chemi-sensor (CRD), or photo-ionization sensor/detector (PID), or other device) 227 which may measure photo-ionization current, and a portion 147 of fluid 125 flows through tube 149 to a pump 151. By placing a "T" tube immediately adjacent to the inlet of detector 227, sampling with minimal time delay may be achieved because of the relatively higher flow 147 to help shorten the filter purge time. Pump 151 may cause fluid 147 to flow from the output of particle filter 143 through tube 149 and exit from pump 151. Pump 153 may effect a flow of fluid 145 through the sensor via tube 157. There may be additional or one pump, and various tube or plumbing arrangements or configurations for system 115 in FIG. 4. Hydrogen may act as a carrier of a sample in fluid 145.

Fluid 145 may proceed through a concentrator 224, through a flow sensor 225, and a separator 226. From separator 226, fluid 145 may go through sensor or detector 228 and exit tube 229 which may be connected to tube 157 and pump 153. Fluid 145 may exit pump 153. Concentrator 224 may have heaters that are turned on sequentially as flow 145 moves by them at the same rate or speed of the heaters being turned on so that a heat pulse builds up in the fluid 145. The heat pulse may move through channel 132 of concentrator 224 at the same rate of or in phase with the fluid 145 in a flow through the channel. As the concentrated fluid 145 goes through separator 226, it may be heated for separation purposes. The heaters may be regarded as "phased heaters. A controller 230 may be connected to a concentrator 224 to control the phasing of the heating of the elements 120, 122, . . . 124 and 126, for providing a concentrated heat pulse in the flow of fluid 145. Controller 230 may also be connected to separator 226, sensors and/or detectors 227, 225 and 228. Controller 230 may be connected to pumps 151 and 153. Data from detectors 225, 227 and 228 may be sent to controller 230 for processing.

Figure 5:
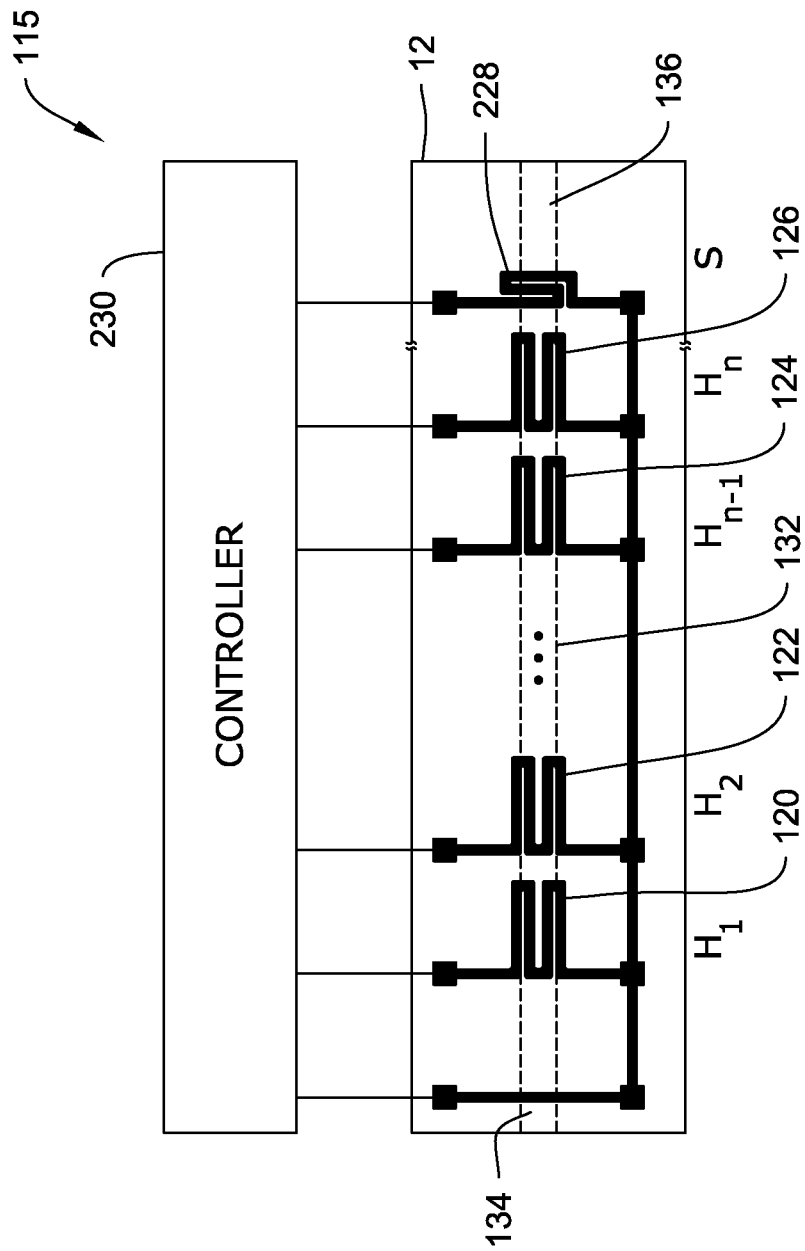
FIGS. 5 and 6 are two views of the heater arrangement for the fluid analyzer.
Figure 6:
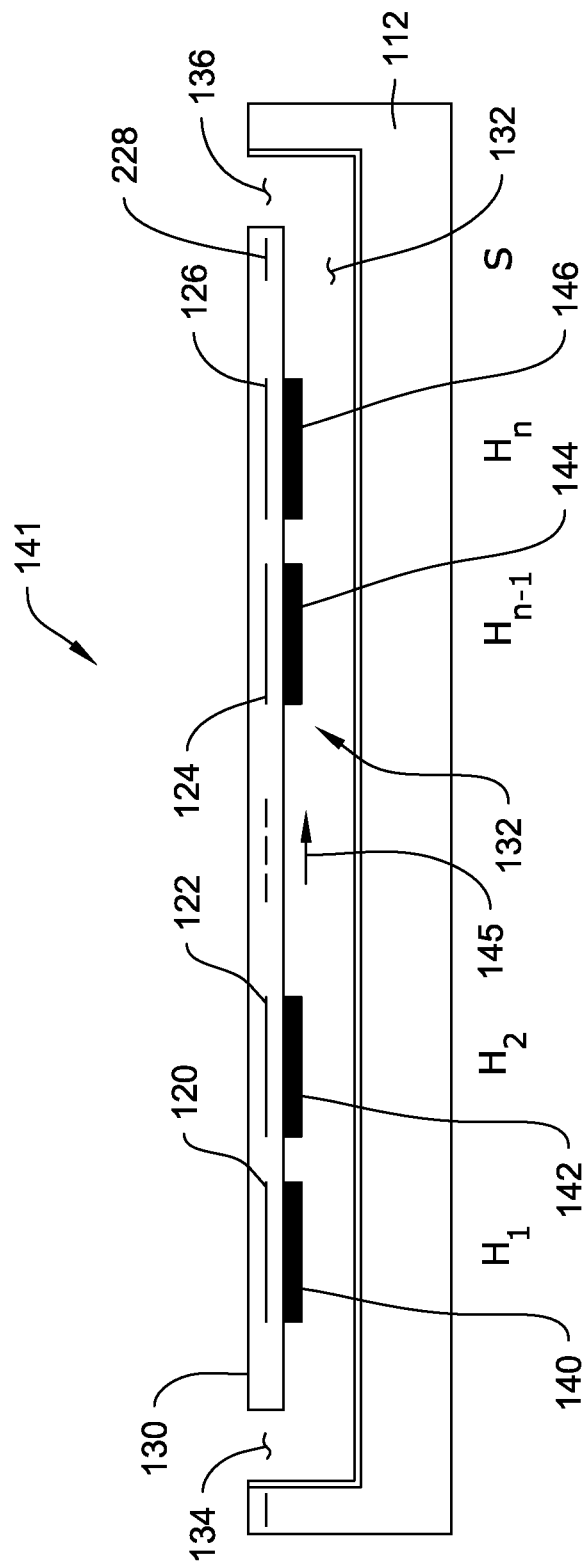

FIG. 5 is a schematic diagram of part of the sensor apparatus 115, representing a portion of concentrator 224 or separator 226 in FIG. 4. The sensor apparatus may incorporate a substrate 112 and a controller 230. Controller 230 may or may not be incorporated into substrate 112. Substrate 112 may have a number of thin film heater elements 120, 122, 124, and 126 positioned thereon. While only four heater elements are shown, any number of heater elements may be provided, for instance, between two and one thousand, but typically in the 20-100 range. Heater elements 120, 122, 124, and 126 may be fabricated of any suitable electrical conductor, stable metal, or alloy film, such as a nickel-iron alloy. Heater elements 120, 122, 124, and 126 may be provided on a thin, low-thermal mass, low-in-plane thermal conduction, support member 130, as shown in FIG. 6. Support member or membrane 130 may be made from $Si_3N_4$ or other appropriate or like material. The heater elements may be made from Pt or other appropriate or like material.

Substrate 112 may have a well-defined single-channel phased heater mechanism 141 having a channel 132 for receiving the sample fluid stream 145, as shown in FIG. 6. Substrate 112 may have a defined channel 132 for receiving a streaming sample fluid 145. The channel may be fabricated by selectively etching silicon channel wafer substrate 112 beneath support member 130. The channel 132 may incorporate an entry port 134 and an exhaust port 136.

The sensor apparatus may also incorporate a number of interactive elements inside channel 132 so that they are exposed to the streaming sample fluid 145. Each of the interactive elements may be positioned adjacent, i.e., for closest possible contact, to a corresponding heater element. For example, in FIG. 6, interactive elements 140, 142, 144, and 146 may be provided on the lower surface of support member 130 in channel 132, and be adjacent to heater elements 120, 122, 124, and 126, respectively. There may be other channels with additional interactive film elements which are not shown in the present illustrative example. The interactive elements may be formed from any number of films commonly used in liquid or gas chromatography.

Figure 7:
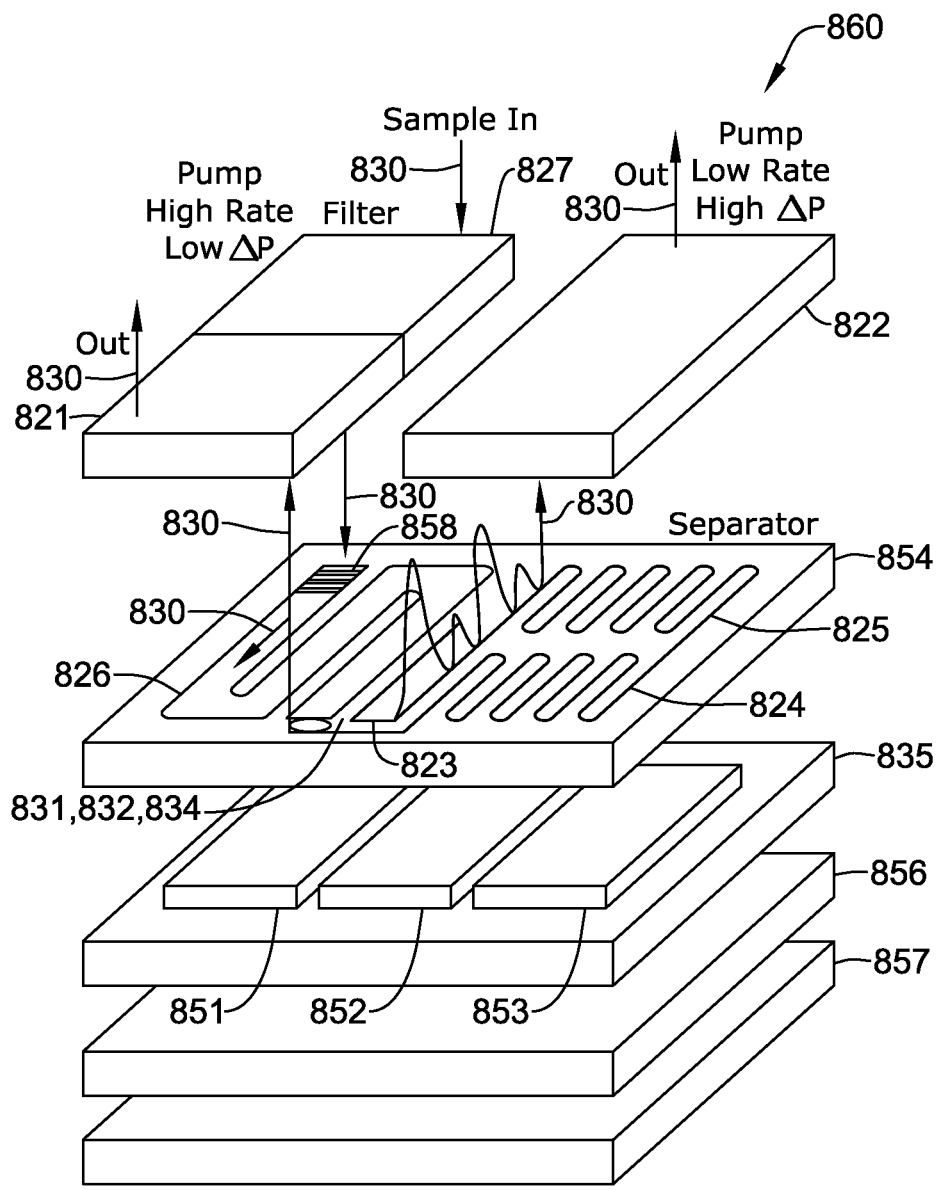
FIG. 7 shows a micro gas analyzer that may have a hydrogen and power generator structurally integrated within the analyzer.

FIG. 7 shows an expanded perspective of a micro analyzer 800. Analyzer 800 may have a channel and a series of heaters situated along the channel. The heaters may turn on in a sequential manner to continually heat a portion of a sample fluid as it moves through the channel. The heaters may provide a heat pulse that moves along the channel at a velocity about the same as a velocity of the portion of the sample fluid moving through the channel. The heaters may cumulatively heat the portion of the sample fluid. There may be a preconcentrator connected to the fluid analyzer.

The lateral dimensions of the package or module 860 of the analyzer 800 may be about 2 cm by 1.3 cm. Module 860 may be a stack of wafers or chips. The vertical dimension of the package may be about 0.7 cm for a volume of about 1.8 cm3. The lower portion of the module 860 may be controller 835 that contains a control electronics 851 chip, a data acquisition and analysis 852 chip and a high frequency drive electronics 853 chip. The lower portion may have a thickness of about 3 millimeters. A middle portion 854 may incorporate pre-concentrator 826, concentrator 823, first separator 824, second separator 825, instrumentation 831, 832 and 834, and at least one channel and the phased heaters 20, 22, 24, . . . , 26. Portion or wafer 854 may or may not incorporate the ITMS 849. Spectrometer 849 may be on a separate chip or stack of chips. The middle portion 854 may have a thickness of about one millimeter. The top portion may contain the first pump 821, second pump 822 and filter 827. The top portion may have a thickness of about 3 millimeters. At the bottom of the lower portion of module 860 may be a layer or portion 856 of wireless communication electronics for data transfer and control of micro analyzer 800. This layer 856 may have a thickness of about 3 millimeters and have about the same lateral area as that of the module 860. Below layer 856 may be a portion for a $H_2$ generator battery system 857 or power pack or holder having a thickness of about 3.8 millimeters thick and about the same lateral area as that of module 860. The generator system 857 may be thicker (e.g., 10 millimeters) or thinner depending on the power needed for the analyzer 800, the desired time between recharges and the technology (e.g., lithium) of the battery. If all of the portions, incorporating the wireless electronics and the battery, are adhered together, the total thickness may be about 1.38 centimeters resulting in a volume of about 3.6 cm$^3$. The dimensions may be relaxed if exceptional compactness is not needed. In the latter case, the top portion with the pumps may have an area less than 25 square centimeters and a thickness less than 10 millimeters. The portion 856 for wireless communication may have an area less than 25 square centimeters and a thickness less than 10 millimeters. The lower portion with controller 835 may have an area less than 25 square centimeters and a thickness of less than 10 millimeters. The middle portion 854 may have an area less than 25 square centimeters and a thickness less than 10 millimeters. The portion for the $H_2$ generator system 857 or its holder may have an area less than 25 square centimeters and a thickness of less than 30 millimeters. In this less exceptionally compact configuration, the total thickness may be about 7 centimeters resulting in a volume of about 175 cm$^3$. In some configurations, the volume of the package or module 860 of the analyzer 800 may be less than about 250 cm$^3$. The above dimensions may be alternatively less than 2.5 square centimeters in lieu of 25 square centimeters. Modules having compact dimensions and correspondingly modest weights as disclosed herein may be usefully incorporable into handheld devices. Such handheld devices may be compatible with handheld operation in the field.

Figure 8:
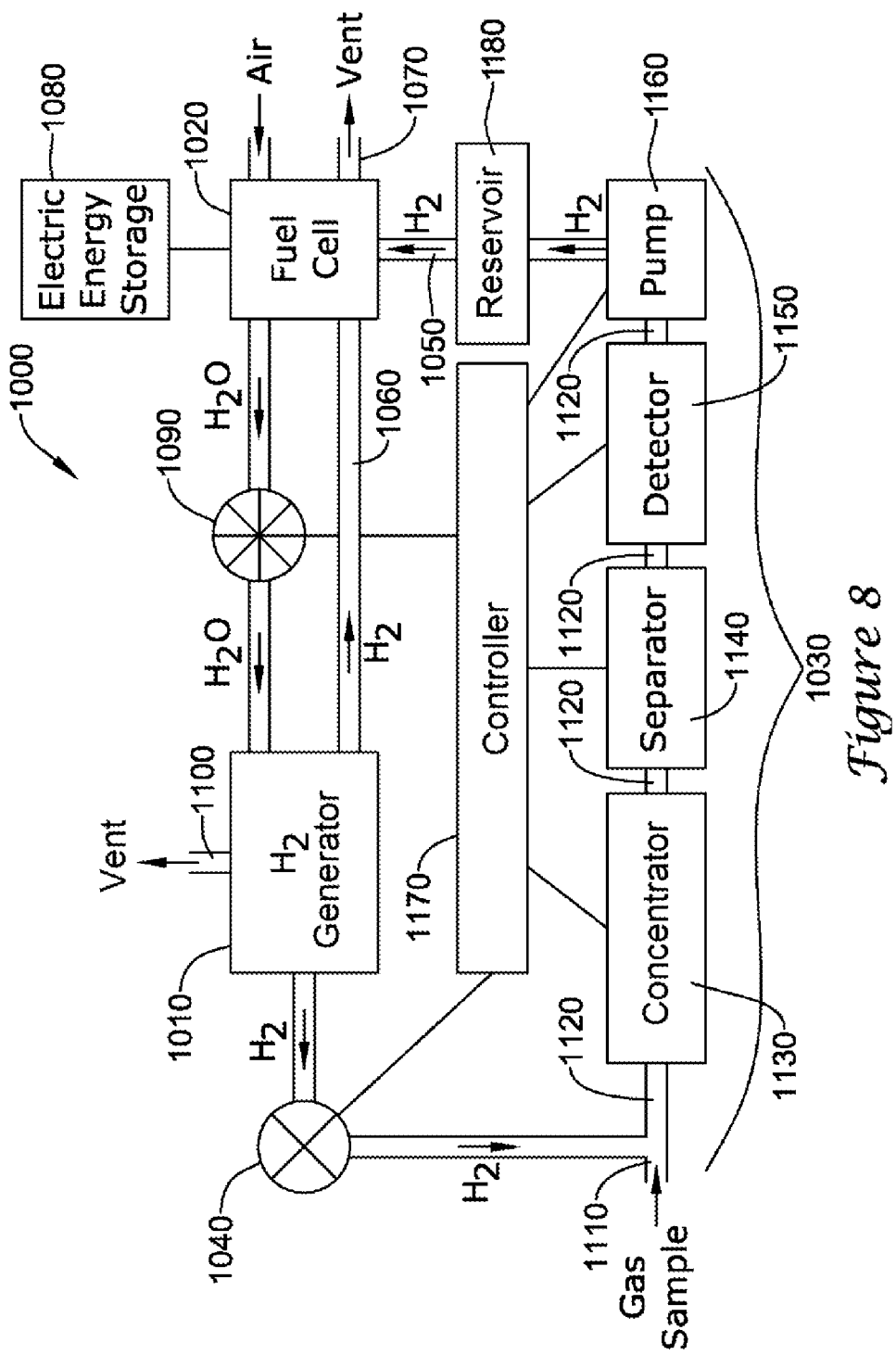
FIG. 8 is a schematic diagram of an illustrative example of a micro analyzer in which a hydrogen gas generator and a fuel cell are integrated with a fluid analyzer.

FIG. 8 is a schematic diagram of an illustrative example of a micro analyzer system 1000 in which a hydrogen gas generator 1010 and a fuel cell 1020 are integrated with a fluid analyzer 1030. Hydrogen gas generator 1010 may be a hydrogen gas generator as disclosed elsewhere herein that reacts hydride metal with water to produce hydrogen gas. Hydrogen gas generator 1010 may supply hydrogen gas to fluid analyzer 1030, which may use the hydrogen gas, for example, as a carrier gas. Flow of hydrogen gas from the gas generator 1010 to the fluid analyzer 1030 may be controlled by valve 1040, which may be a variable valve or an on/off valve. After non-destructive use by the gas analyzer 1030, the gas analyzer may forward hydrogen gas to the fuel cell 1020 where it may be consumed to generate electric power. As illustrated in FIG. 8, hydrogen gas may be forwarded from the fluid analyzer 1030 to the fuel cell 1020 directly (as at 1050), without returning the hydrogen gas first to the hydrogen gas generator 1010. In some illustrative instances, hydrogen gas may be returned to the hydrogen gas generator and/or a hydrogen gas reservoir 1180, after which it may be forwarded to a fuel cell. In the illustrative example of FIG. 8, the hydrogen gas generator 1010 may also supply hydrogen gas directly to the fuel cell 1020 for consumption via direct feed line 1060. Direct feed line 1060 may or may not incorporate a valve (not shown), which may be an on/off valve or a variable valve.

The relative amounts of hydrogen gas supplied to fuel cell 1020 via forwarding from fluid analyzer 1030 vs. via direct feed line 1060 may depend on rates of usage and consumption of various devices in system 1000. The fluid analyzer 1030 may use hydrogen gas from the hydrogen gas generator in a nondestructive manner at a device rate. In some instances, other devices that use hydrogen gas non-destructively or destructively may be contemplated. In some instances, a flame ionization detector and/or gas calibration device may be incorporated. Fuel cell 1020 (or other electric power generator) may consume hydrogen gas at an electric generator rate. Fuel cell 1020 (or other electric power generator) may be capable of providing substantially all electric energy needed by the fluid analyzer 1030 (or other device) for its operation. If the device rate exceeds the electric generator rate, then substantially all the hydrogen gas consumed by the electric power generator may be forwarded to the electric power generator from the device. In this scenario, hydrogen gas may not be supplied from the hydrogen gas generator 1010 to fuel cell 1020 via direct feed line 1060. Hydrogen gas used by the device in excess of the electric generator rate may be vented from the system, as at 1070. Alternately, excess hydrogen gas may be routed a hydrogen reservoir 1180 and/or to the hydrogen gas generator 1010. If the electric generator rate exceeds the device rate, then hydrogen gas forwarded via direct feed line 1060 may supplement the hydrogen gas forwarded from the fluid analyzer (device) 1030.

The fuel cell 1020 (electric power generator) may be capable of providing substantially all electric energy needed by the fluid analyzer 1030 (device) for its operation. While this may be the case over longer averaging intervals, in some instances, the instantaneous rate at which electric power is generated by the fuel cell 1020 (which may depend at least in part upon the rate at which hydrogen gas is delivered to the fuel cell) may not match the instantaneous rate at which electric power is needed by the fluid analyzer 1030. The fuel cell 1020 (electric power generator) may be coupled to an electric energy storage mechanism 1080, which may be configured to store electric energy from the electric power generator when the electric power generator generates more power than instantaneously needed by the device, and provides electric energy to the device when the electric power generator generates less power than instantaneously needed by the device. Fuel cell 1020 and electric energy storage mechanism 1080 may be provided with any suitable energy management control system. Fuel cell 1020 and electric energy storage mechanism 1080 may provide electric power to additional devices beyond the fluid analyzer 1030 or other primary device.

$H_2O$ generated by fuel cell 1020 may be forwarded to the hydrogen gas generator, where it may be used to generate hydrogen gas. Fan and/or pump 1090 may control the flow of $H_2O$ from the fuel cell 1020 to the hydrogen gas generator 1010. $H_2O$ fed from the fuel cell 1020 to hydrogen gas generator 1010 may be gaseous, and may be mixed with air. Fan and/or pump 1090 may, at least in part, actively control the rate of electric power and/or $H_2$ generation. Excess $H_2$, air, and/or $H_2O$ may be vented from the hydrogen gas generator 1010 at 1100.

A gas sample may enter the fluid analyzer 1030 at 1110 and be mixed with $H_2$ gas (carrier gas) after intake. Sample fluid/gas intake may be continuous. The sample/carrier gas mixture may proceed through the fluid analyzer in a flow channel 1120, which may proceed through a concentrator 1130, separator 1140, and detector 1150. Concentrator 1130 may be any suitable concentrator, and may incorporate an array of "phased" heaters as described elsewhere herein. Separator 1140 may be any suitable separator, and may incorporate an array of "phased" heaters. In some fluid analyzers, separator 1140 may not be present. Detector 1150 may be a differential thermal-conductivity detector (TCD), chemi-sensor (CRD), photo-ionization sensor/detector, mass spectrometer (MS) such as a time-of-flight mass spectrometer, or any other suitable detector or detectors. A pump 1160 may draw the sample/carrier gas mixture through the fluid analyzer 1030.

The flow channel 1120 of fluid analyzer 1030 may be valveless from sample intake through pump 1160. The flow channel 1120 may be valveless at least the beginning of the concentrator 1130 through the end of the detector 1150. A lack of valves or reduction in the number of valves in a fluid analyzer may result in a simpler, less-expensive, easier-to-assemble, and/or more robust device. Other fluid analyzers or devices of the present disclosure, such as those of FIGS. 1, 2, 4, and 7, may also be valveless.

The micro analyzer system 1000 may be provided in a module of dimensions and weight suitable and incorporable into a handheld device. A fluid analyzer 1030 with concentrator 1130, separator 1140, and mass spectrometer detector 1150 may displace about 100 cm$^3$. A pump 1160 for such a system may displace about 200 cm$^3$. Such a fluid analyzer system may operate on about 25 to 30 W of electric power. The fluid analyzer would consume between about 10 and 100 sccm (standard cubic centimeters per minute) of $H_2$ gas on average. Such a handheld fluid analyzer system may be provided with a fuel cell 1020 and hydrogen gas generator 1010 capable of supporting a continuous mission of 8 hours or more. The volume displaced by these gas and power generating components may be about 300-350 cm$^3$. The fuel cell 1020 may displace about 150 cm$^3$. The hydrogen gas generator may displace about 100-150 cm$^3$. The fan/pump 1090 may displace about 50 cm$^3$. Such a system may be capable of producing about 260 sccm or more of $H_2$ for about 8 or more hours. This flow rate of $H_2$ would be sufficient both for fluid analyzer and power generation needs for such a handheld fluid analyzer system. A handheld or otherwise portable fluid analyzer system may be structured to permit easy swapping of a hydrogen gas generation fuel cartridge (containing, for example, unreacted hydride metal) between missions. A handheld/portable fluid analyzer system may be constructed to support recharging for approximately 800 to 1000 missions. Such a device may provide a portable point sensor capable of universal analyte analysis, sensitive to any gas analyte.

Figure 9:
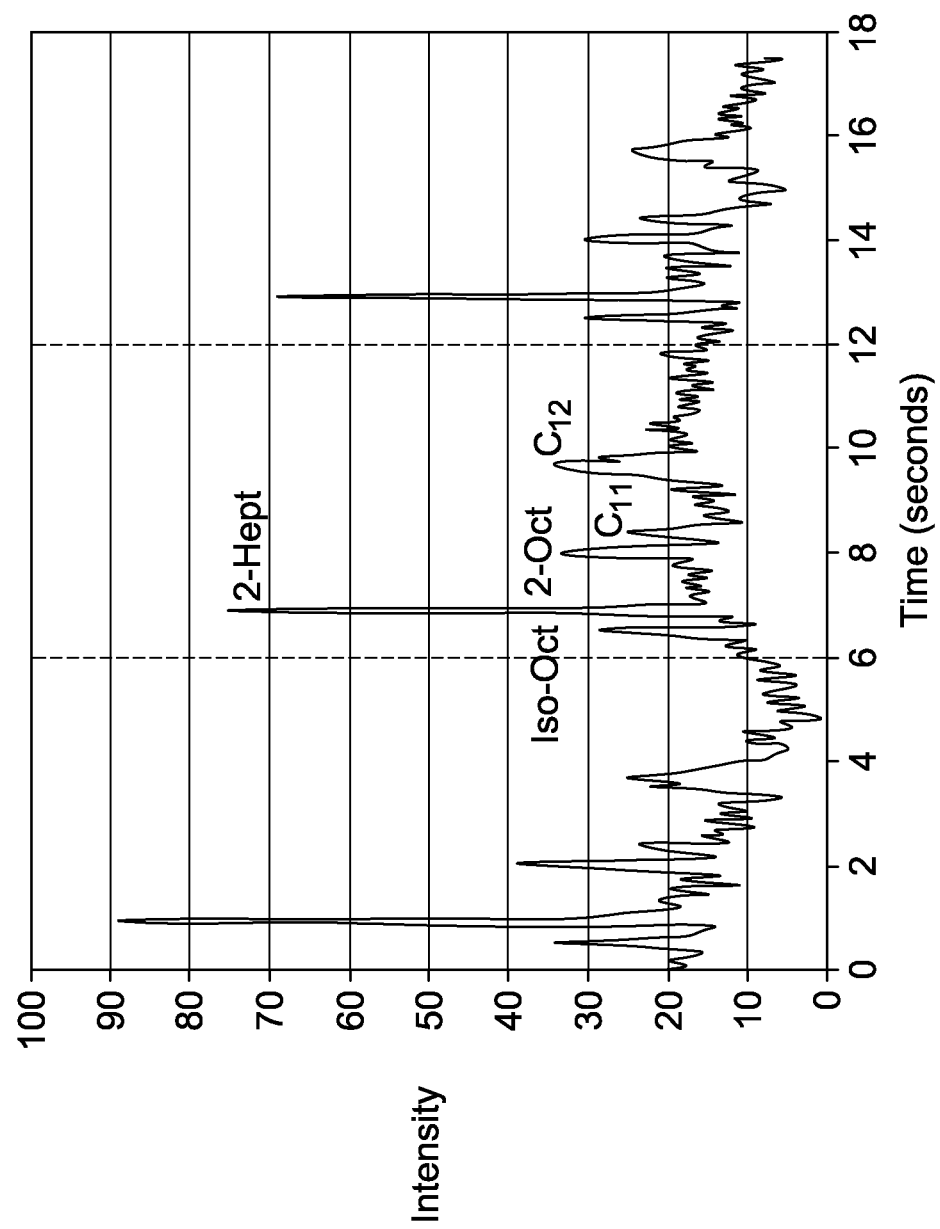
FIG. 9 is a graph of data from an illustrative fluid analyzer system showing the capability of the fluid analyzer to analyze consecutive samples in six second intervals.

Aspects of fluid analyzers of the present disclosure, such as valveless operation, may support continuous sample intake and rapid analysis. FIG. 9 is a graph of data from an illustrative fluid analyzer system showing the capability of the fluid analyzer to analyze consecutive samples in six second intervals. In some illustrative instances, fluid analyzer systems may be capable of performing analysis cycles in less than about ten seconds. It is expected that such performance may be achieved in the compact fluid analyzer systems of the present disclosure, such as those of FIGS. 1, 2, 4, 7, and 8. A description of the fluid analysis system used to obtain the data of FIG. 9 follows:

Sample generation—A gas mixture containing the 5 analytes (Iso-Oct, 2-Hept, 2-Oct, $C_{11}$, $C_{12}$) was allowed to flow through a ¼" pipe. The flow was controlled by mass flow controllers in such a way as to ensure the pressure within the pipe was only slightly above ambient atmospheric pressure. The background gas was Nitrogen. (Use of $H_2$ gas would be expected to produce equal or better concentration and separation results.)

Set-up of PHASED for this experiment—the PHASED chip inlet was a ~15 cm 0.36 mm OD 0.25 mm ID deactivated silica capillary guard column. One end of the capillary was interfaced to a "T" junction in the ¼" sample generation pipe. The other end of the capillary was hermetically sealed into the PHASED chip with JB-Weld epoxy. The outlet of the PHASED chip had a 15 cm 0.36 mm OD×0.18 mm ID DB-5 column with 0.4 micrometers of stationary phase. This separation capillary was connected to the inlet line of a commercial mass spectrometer (MS) by means of a press-tight fitting. The vacuum of the MS's ionization chamber provided sufficient pull at the end of the inlet line to provide approximately 2 sccm of flow through the column, PHASED, inlet capillary set-up. All capillaries were kept at room temperature (approx. 23 C), with an exception of the column. The column was kept at a temperature of approximately 65 C. The top-cap of the PHASED chip was heated to approx. 65 C to prevent analyte sticking on the silicon channel walls.

Activation of PHASED—Upon connecting the MS inlet line to the column the PHASED system began sampling gas mixture from the sample generation pipe. Each of the PHASED heaters was set to a 12 millisecond "overlapped" state time. The state time is the heater's "on-time"-12 milliseconds which was experimentally determined to provide the best injection for this flow rate. A 12 millisecond state time means that at time 0.000, heater #1 would turn on for 12 milliseconds, turning off at time 0.012 seconds. "Overlapped" describes the relation of the start times of adjacent heaters. Specially, it indicates that the n+1 heater turns on ½ of the state time after the nth heater. So, the first heater turns on at 0.000 seconds, the second heater turns on at 0.006 seconds (for a 12 millisecond state time). Likewise, the first heater turns off at 0.012 seconds and the second heaters at 0.018 seconds. The third heater turns on at 0.012 seconds. Activating the PHASED heaters in this method for this chip design prevent the desorbed gasses from back streaming against the low flow rate and broadening the chromatographic injection. The PHASED chip used for this experiment was a "30 loop" design. This design has 60 individually addressed heaters. Therefore, the entire injection process took 0.366 seconds to complete.

Continuous analysis—Because the sample is always being pulled into the PHASED immediately after the 0.012 second mark, the first heater begins to cool and collect analytes from the constantly flowing analyte stream. As the heaters cool and collect analytes, the remaining Nitrogen is pulled through the chip and acts as the chromatographic carrier gas within the column. Because of this design, the PHASED system can act without valves that switch between two distinct sample and carrier gas streams. This design feature also allows PHASED to continuously analyze the sample item. At the 6.000 second mark above, every PHASED heater had been collecting sample for the second injection/analysis for at least 5.634 seconds, with the first heater collecting sample for 5.988 seconds. This feature make it possible to provide continuous air measurements of potentially hazardous compounds, where extra seconds needed for sequential sample collection and analysis could cause severe harm to people exposed to hazardous gases.

The disclosure may be related to U.S. Pat. No. 6,393,894 B1, issued May 28, 2002, and entitled, "Gas Sensor with Phased Heaters for Increased Sensitivity", which is incorporated herein by reference.

The disclosure may be related to U.S. Pat. No. 7,001,681, issued Feb. 21, 2006, and entitled, "Water Vapor Transport Power Generator", which is incorporated herein by reference.

The disclosure may be related to U.S. Patent Application Publication Number 2005/0142410, published Jun. 30, 2005, and entitled, "Micro Fuel Cell", which is incorporated herein by reference.

The disclosure may be related to U.S. Patent Application Publication Number 2009/0252670, published Oct. 8, 2009, and entitled, "Hydrogen Generator", which is incorporated herein by reference.

The disclosure may be related to U.S. Pat. No. 7,901,816, issued Mar. 8, 2011, and entitled, "Water Reclamation in a Micropower Generator", which is incorporated herein by reference.

This application may be related to U.S. patent application Ser. No. 12/903,901, filed Oct. 13, 2010, entitled "Hydrogen Generator", which claims the benefit of U.S. Provisional Application Ser. No. 61/285,479, filed Dec. 10, 2009, entitled "Hybrid Fuel Cell", both of which are incorporated herein by reference.

In the present specification, some of the matter may be of a hypothetical or prophetic nature although stated in another manner or tense.

Although the item of the disclosure has been described with respect to at least one illustrative example, many variations and modifications will become apparent to those skilled in the art upon reading the present specification. It is therefore the intention that the appended claims be interpreted as broadly as possible in view of the prior art to incorporate all such variations and modifications.

What is claimed is:

1. A generation system comprising:
a fuel cell to create electrical power and provide water;
a hydrogen gas generator including a first input channel, an output channel, and a direct feed line, the hydrogen gas generator to generate hydrogen gas from the water and a metal hydride, wherein the hydrogen gas generator is mechanically connected to the fuel cell by the first input channel and the direct feed line, wherein the first input channel provides the water to the hydrogen gas generator and the direct feed line provides generated hydrogen from the hydrogen generator to the fuel cell, and wherein the hydrogen gas generator pressurizes hydrogen gas and provides the pressurized hydrogen gas to the output channel;
a second input channel connected to the output channel of the hydrogen gas generator, the second input channel to provide a gas sample to be carried by the pressurized hydrogen gas in the output channel;
an electrically powered fluid analyzer mechanically connected to the second input channel, and to the output channel of the hydrogen gas generator, the fluid analyzer to analyze the gas sample from the second input channel, the fluid analyzer electrically connected to the fuel cell to receive electrical power therefrom, the fluid analyzer comprising:
a concentrator connected to the input channel and the output channel of the hydrogen gas generator;
a separator mechanically connected to the concentrator to separate the carrier gas from the sample;
a detector connected to the separator; and
a flow channel through the concentrator, the separator, and the detector, wherein the flow channel is valveless at least from the beginning of the concentrator through the end of the detector; and
a hydrogen gas reservoir connected between the fuel cell and the detector of the fluid analyzer, the hydrogen gas reservoir for storing hydrogen gas separated by the separator in the fluid analyzer; and
wherein:
the fuel cell draws hydrogen gas from the hydrogen gas reservoir against a vacuum at an electric generator rate to provide electrical power to the fluid analyzer; and
the fluid analyzer provides the recycled hydrogen gas to the hydrogen gas reservoir at a rate greater than the electric generator rate.

2. The system of claim 1, wherein the fluid analyzer is capable of operation with continuous intake of a sample fluid.

3. The system of claim 1, wherein:
the fluid analyzer further comprises a plurality of heaters situated along a portion of the flow channel;
the plurality of heaters are configured to turn on in a sequential manner to continually heat a portion of a sample fluid as it moves along the portion of the flow channel; and
the plurality of heaters are configured to provide a heat pulse that moves along the portion of the flow channel at a velocity about the same as a velocity of the portion of the sample fluid moving along the portion of the flow channel.

4. The system of claim 3, wherein the plurality of heaters cumulatively heat the portion of the sample fluid.

5. The system of claim 4, wherein the fluid analyzer is configured to perform an analysis cycle in less than about ten seconds.

6. The system of claim 1, wherein the hydrogen gas generator, the fuel cell, and the fluid analyzer are provided in a module incorporable into a handheld device.

7. The system of claim 6, wherein the system is capable of performing fluid analysis continuously for at least about eight hours.

8. A generator system comprising:
a fuel cell to create electrical power and provide water;
a hydrogen gas generator connected to the fuel cell by a direct feed line and a first input channel, wherein the hydrogen gas generator generates hydrogen gas from water and a metal hydride, wherein hydrogen gas generator pressurizes the hydrogen gas and provides the pressurized hydrogen gas to an output channel of the hydrogen gas generator to prevent the need for a carrier gas pump, wherein the first input channel provides the water to the hydrogen gas generator and the direct feed line provides generated hydrogen from the hydrogen generator to the fuel cell;
a second input channel connected to the output channel of the hydrogen gas generator, the second input channel to provide a gas sample to be carried by the pressurized egn in the output channel;
a device connected to the second input channel, to the output channel, and the hydrogen gas reservoir, wherein the device needs electric power for its operation and uses hydrogen gas during operation, wherein the device is electrically connected to the fuel cell to receive electrical power therefrom;
a hydrogen gas reservoir connected between the fuel cell and the device, the reservoir for storing excess hydrogen gas; and
wherein the device uses the hydrogen gas from the hydrogen gas generator as a carrier gas and forwards a recycled hydrogen gas used by the device to the hydrogen gas reservoir, wherein the fuel cell draws hydrogen gas from the reservoir as a fuel to generate electrical power, leaving excess hydrogen gas in the hydrogen gas reservoir;
the fuel cell draws the recycled hydrogen gas from the hydrogen gas reservoir against a vacuum to provide electrical power to the device.

9. The system of claim 8, wherein the device provides all of the hydrogen gas used by the device to the fuel cell without excess hydrogen gas in the hydrogen gas reservoir.

10. The system of claim 8, wherein:
the device provides hydrogen gas from the hydrogen gas generator to the hydrogen gas reservoir at a device rate;
the fuel cell consumes hydrogen gas at an electric generator rate; and
if the device rate exceeds the electric generator rate, substantially all the hydrogen gas consumed by the fuel cell is forwarded to the fuel cell from the device, and hydrogen gas provided by the device in excess of the electric generator rate is vented from the system.

11. The system of claim 8, wherein:
the device provides hydrogen gas from the hydrogen gas generator to the hydrogen gas reservoir at a device rate;
the fuel cell consumes hydrogen gas at an electric generator rate; and
if the device rate exceeds the generator rate, substantially all the hydrogen gas consumed by the fuel cell is forwarded to the fuel cell from the hydrogen gas reservoir, and hydrogen gas provided by the device in excess of the electric generator rate is routed to the hydrogen reservoir.

12. The system of claim 8, wherein some hydrogen gas from the hydrogen gas generator is forwarded directly to the fuel cell, bypassing the device.

13. The system of claim 8, wherein the fuel cell is capable of providing substantially all electric energy needed by the device for its operation.

14. The system of claim 13, further comprising an electric energy storage mechanism connected to the fuel cell and the device, wherein the electric energy storage mechanism is configured to store electric energy from the fuel cell when the fuel cell generates more power than instantaneously needed by the device, and provides electric energy to the device when the fuel cell generates less power than instantaneously needed by the device.

15. The system of claim 8, wherein the device is selected from a group consisting of a flame ionization detector, a gas chromatograph, a gas calibration device, and any combination thereof.

16. The system of claim 8, wherein the hydrogen gas generator, the fuel cell, and the device are provided in a module incorporable into a handheld device.

\* \* \* \* \*